United States Patent
White et al.

(10) Patent No.: US 7,133,145 B2
(45) Date of Patent: Nov. 7, 2006

(54) METHOD AND ASSEMBLY FOR CARRIAGE LOCKING

(75) Inventors: Scott D. White, Boise, ID (US); Todd Loveland, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 10/358,838

(22) Filed: Feb. 5, 2003

(65) Prior Publication Data

US 2004/0150862 A1    Aug. 5, 2004

(51) Int. Cl.
 *G06K 15/00* (2006.01)
 *H04N 1/00* (2006.01)
(52) U.S. Cl. ...................... 358/1.14; 358/437
(58) Field of Classification Search .................. 358/1.1, 358/1.4, 1.7, 1.8, 1.9, 1.14, 1.15, 500, 501, 358/502, 503, 505, 514, 508, 530, 437
See application file for complete search history.

(56) References Cited

U.S. PATENT DOCUMENTS 5,767,977 A * 6/1998 Thelen et al. ............... 358/296
5,769,515 A   6/1998 Chang ........................ 312/223.2
5,973,866 A   10/1999 Tseng ........................ 359/896
6,081,630 A   6/2000 Kaneko ...................... 382/313
6,402,034 B1  6/2002 Yeh ........................... 235/472.01
2003/0043028 A1* 3/2003 Torikai et al.

FOREIGN PATENT DOCUMENTS

JP    11 027462    1/1999

* cited by examiner

Primary Examiner—Douglas Q. Tran

(57) ABSTRACT

A carriage locking system for a device comprising a housing having a power cord receptacle. The system includes a carriage moveable in the housing. A power cord for the insertion into the power cord receptacle is also included. A carriage latch is moveable between a latched position to prevent movement of the carriage and an unlatched position allowing for movement of the carriage. The system further comprises a sensor operative to detect the presence of the power cord in the receptacle and operatively associated with the carriage latch such that the carriage latch moves to the unlatched position when the power cord is inserted in said power cord receptacle and the carriage latch moves to the latched position when the power cord is removed from the power cord receptacle.

21 Claims, 3 Drawing Sheets

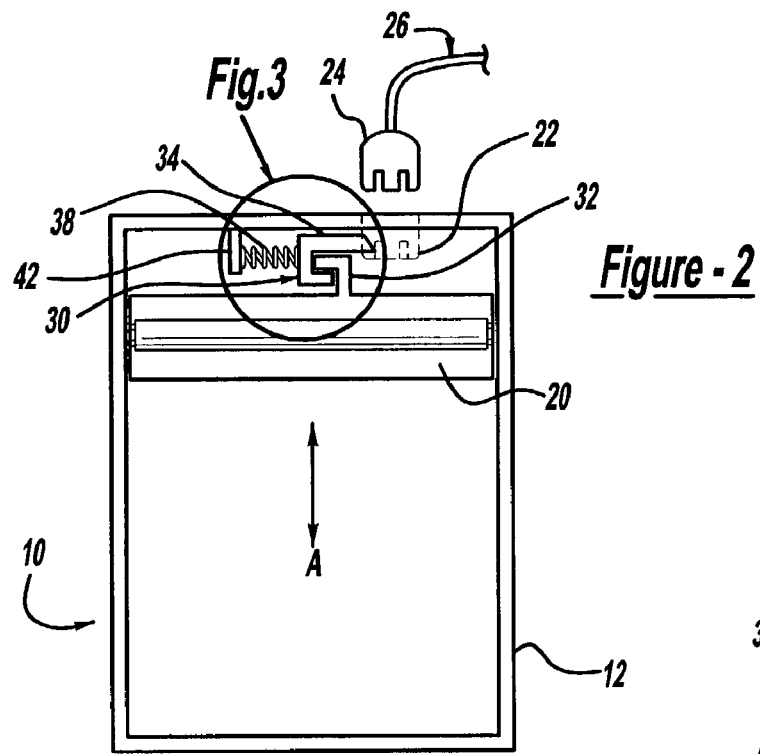
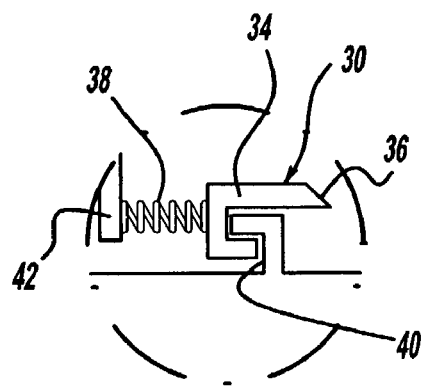
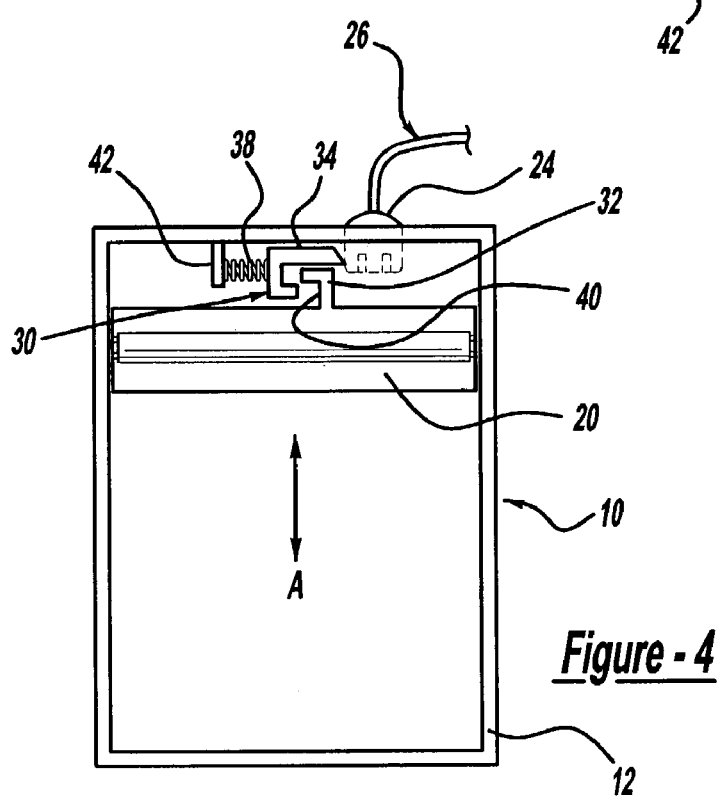
*Figure - 2*
*Figure - 3*
*Figure - 4*

METHOD AND ASSEMBLY FOR CARRIAGE LOCKING

BACKGROUND

Optical scanners are electromechanical devices used to capture and digitize images. For example, an optical scanner may be used to capture the image of printed matter on a sheet of paper. The digitized image may then be electronically stored and/or processed. The typical optical scanner includes a housing having power cord receptacle for receiving a power cord, a light source, various lenses, mirrors and other optical components. An optical carriage is typically moveably supported in the housing. A motor drives the optical carriage.

Typically prior to packaging of a scanner, the optical carriage is manually locked so that it cannot, relative to the housing, move during shipment. Otherwise, the optical carriage may move around and cause the optical components of the scanner to get out of proper alignment or cause damage to components of the scanner. Such manual locking scanners are shown in U.S. Pat. No. 5,767,977 to Thelen et al, and assigned to the assignee of the present application.

Prior to use of the scanner, these manual systems must be unlocked. Failure to unlock the system could potentially damage the motor, if the user attempts to operate the scanner with the optical carriage in the locked position. Additionally, if the scanner is moved to a new location, after it has been removed from the packaging and used, it is desirable to lock the optical scanner during the move to prevent damage to the components of the scanner. Of course, the carriage must be unlocked after the move is complete to allow use of the scanner.

SUMMARY

According to one presently preferred embodiment of the present invention, there is provided a carriage locking system for a device comprising a housing having a power cord receptacle. The system further includes a carriage moveable in the housing. A power cord for insertion into the power cord receptacle is also included. A carriage latch is moveable between a latched position to prevent movement of the carriage and an unlatched position allowing for movement of the carriage. The system further comprises a sensor operative to detect the presence of the power cord in the receptacle and operatively associated with the carriage latch such that the carriage latch moves to the unlatched position when the power cord is inserted in said power cord receptacle and the carriage latch moves to the latched position when the power cord is removed from the power cord receptacle.

According to another presently preferred embodiment of the present invention, there is provided a carriage locking system for a device comprising a housing having a power cord receptacle. A carriage is moveable in the housing. A power cord is provided for insertion into the power cord receptacle. The system further comprises a carriage latch moveable between a latched position to prevent movement of the carriage and an unlatched position allowing for movement of the carriage. The system also includes sensor means for detecting the presence of the power cord in the receptacle and operatively associated with the carriage latch such that the carriage latch moves to the unlatched position when the power cord is inserted in the power cord receptacle and the carriage latch moves to the latched position when the power cord is removed from said power cord receptacle.

A method of locking a carriage of a device of the type including a housing having a power receptacle for receiving a power cord and a carriage moveable in the housing is also provided. One presently preferred method comprises the steps of selectively inserting the power cord into the power cord receptacle to thereby move a carriage latch to an unlatched position in response to the insertion of the power cord into the power cord receptacle wherein the carriage is moveable with respect to the housing. The method further comprises the step of selectively removing the power cord from the power cord receptacle and to thereby move a carriage latch to a latched positioning response to the removal of the power cord from the power cord receptacle wherein the carriage is locked with respect to the housing.

Further areas of applicability of the present invention will become apparent from the detailed description provided hereinafter. It should be understood that the detailed description and specific examples, while indicating representative embodiments of the invention, are intended for purposes of illustration only and are not intended to limit the scope of the invention.

BRIEF DESCRIPTION OF THE DRAWINGS

FIG. 2 shows a schematic plan view of scanner in a latched position in accordance with one embodiment the present invention;

FIG. 3 is an enlarged sectional view of the latch mechanism of FIG. 2;

FIG. 4 shows a schematic plan view of the scanner of FIG. 2 in the unlatched position;

DETAILED DESCRIPTION

The following description of the representative embodiment(s) is merely exemplary in nature and is in no way intended to limit the invention, its application, or uses.

Figure 1:
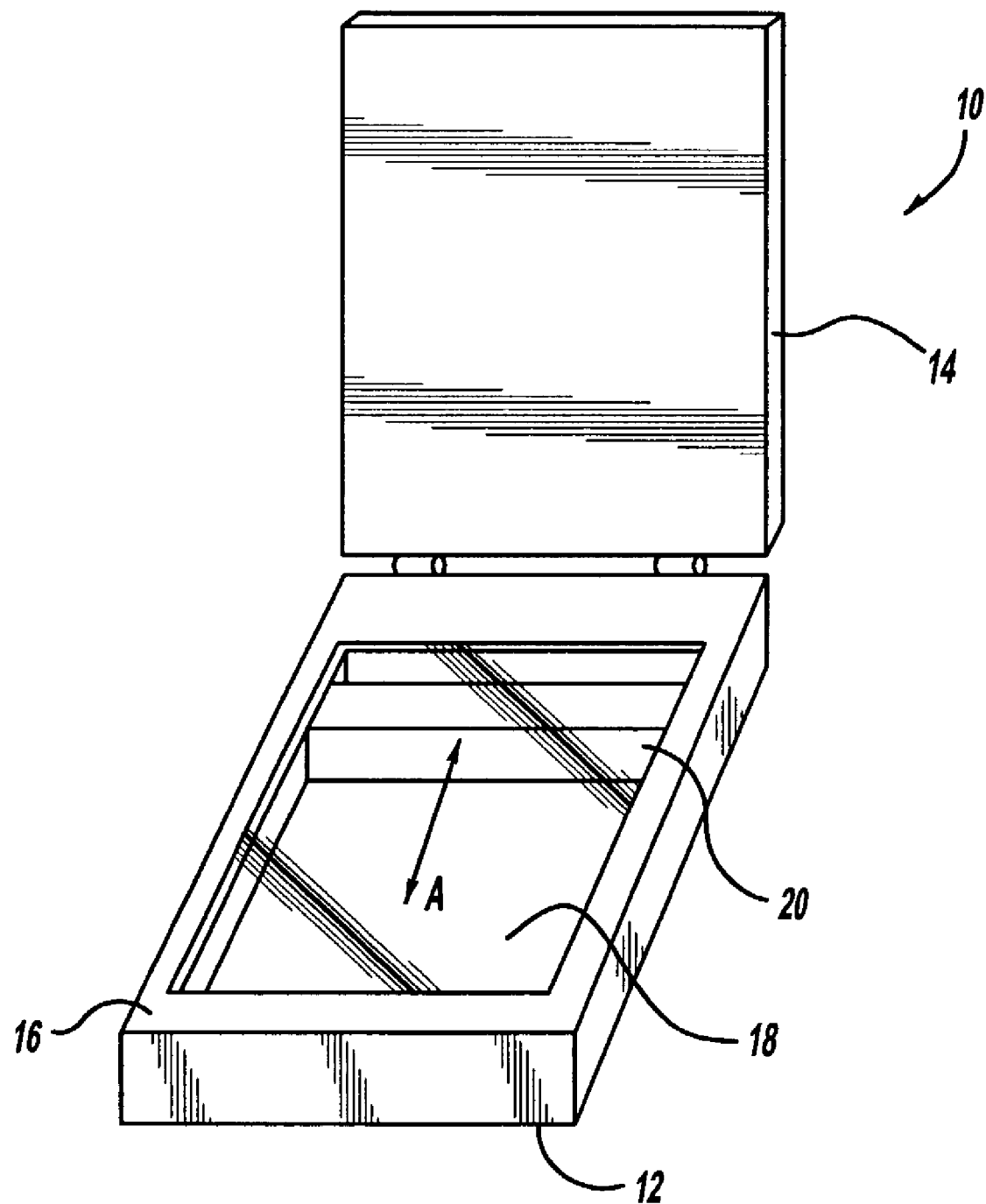
FIG. 1 shows a schematic perspective view of an image scanner.

FIG. 1 shows a schematic perspective view of an image scanner. In FIG. 1 an electromechanical device, particularly a scanner is generally indicated at 10. The scanner 10 includes a housing 12. A cover 14 may be attached to the housing 12 and is pivotal with respect thereto. The housing 12 includes an upper surface 16 that supports a glass platen 18 onto which a document is placed. An optical carriage 20 is movably supported in the housing 12. The optical carriage 20 moves forward and aft, in the direction of the axis A.

FIG. 2 shows a schematic plan view of scanner in a latched position in accordance with one embodiment the present invention As shown in FIG. 2, the housing 12 includes a power cord receptacle 22. The power cord receptacle 22 is for receiving one end 24 of a power cord, generally indicated at 26. The opposite end 28 of the power cord 26 is adapted to be plugged in to a power outlet.

A carriage latch, generally indicated at 30 is supported within the housing 12. FIG. 3 is an enlarged sectional view of the latch mechanism of FIG. 2. FIG. 4 shows a schematic plan view of the scanner of FIG. 2 in the unlatched position. The carriage latch 30 is moveable between a latched position, as shown in FIG. 2 to prevent movement of the carriage 20 and an unlatched position, as shown in FIG. 4, allowing for movement of the carriage 20. The carriage latch 30 may take any suitable configuration that can engage a suitable structure 32 on the carriage 20.

It will be appreciated that one embodiment of the carriage latch 30 and structure 32 are shown in FIGS. 2–4. The carriage latch 30 comprises an engaging member 34. As shown in FIGS. 2–4, the engaging member 34 is U-shaped. Preferably one arm of the U-shaped member 34 is longer than the other arm. One of the arms includes a ramped surface 36, best seen in FIG. 3 thereon. The ramped surface 36 engages the first end 24 of the power cord 26 as it is inserted into the power cord receptacle 22. The ramped surface 36 detects the presence of the power cord 26 because of the physical contact between the first end 24 of the power cord 26 and the ramped surface 36. In this sense, the ramped surface 36 acts as a sensor to detect the presence of the power cord 24 in the power cord receptacle 22.

The opposite arm of the U-shaped member 34 interacts with the structure 32 on the carriage 20. The structure 32 comprises a flange extending outwardly from the carriage 20. The flange defines a pocket 40 for receiving one arm of the U-shaped member, as best shown in FIG. 3.

A biasing member 38 acts against the U-shaped member 34 and urges the carriage latch 30, into the pocket 40. Preferably, the biasing member 38 comprises a spring 38. A suitable support structure 42 is secured within the housing 12 and supports one end of the spring 38. When the carriage latch 30 is inserted in the pocket 40, the carriage 20 is in the latched or locked position, and movement of the carriage 20 is prevented. As shown in FIG. 2, when the first end 24 of the power cord 26 is removed from the receptacle 22, the spring 38 urges one arm of the carriage latch 30 into the pocket 40 to latch the carriage 20.

To move the carriage latch 30 to the unlatched position, the first end 24 of the power cord 26 is inserted into the receptacle 22. The first end 24 of the power cord 26 engages the ramped surface 36 of the U-shaped member 34. The contact between the first end 24 of the power cord 26 and the ramped surface 36 causes the U-shaped member 34 of the carriage latch 30 to move against the biasing of the spring 38. This movement causes the arm of the U-shaped member 34 to be moved out of the pocket 40, as best seen in FIG. 4. When in this position, the carriage latch 30 is in this unlatched position, allowing movement of the carriage 20.

It will be appreciated that while the carriage latch 30 is shown as a U-shaped member 34, the carriage latch 30 may take any suitable configuration. Similarly, the structure 32 may take any suitable configuration. The configurations of the carriage latch 30 and structure 32 preferably cooperate to allow locking and unlocking of the carriage 20. Further, while the carriage latch 30 is shown to act perpendicularly to the path of insertion of the first end 24 of the power cord 26 into the receptacle, it can act parallel to or collinearly with the path of travel of the first end 24 of the power cord 26. Similarly, the carriage latch 30 can act in a rotational manner.

Figure 5:
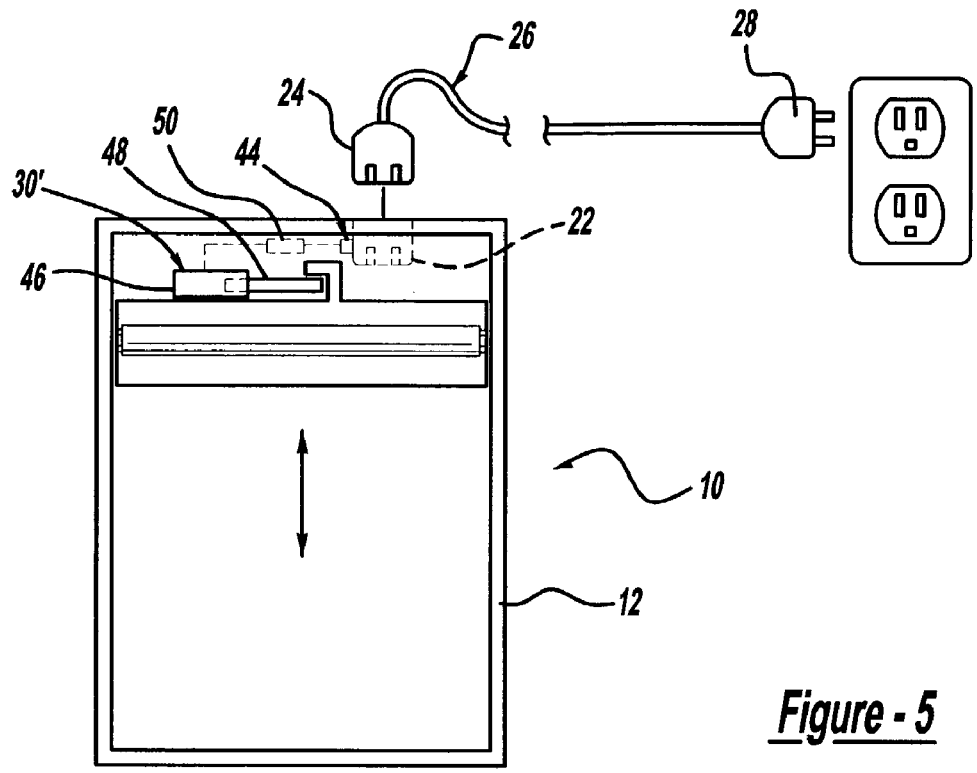
FIG. 5 shows a schematic plan view of a scanner in a latched position in accordance with an alternate embodiment of the present invention.
Figure 6:
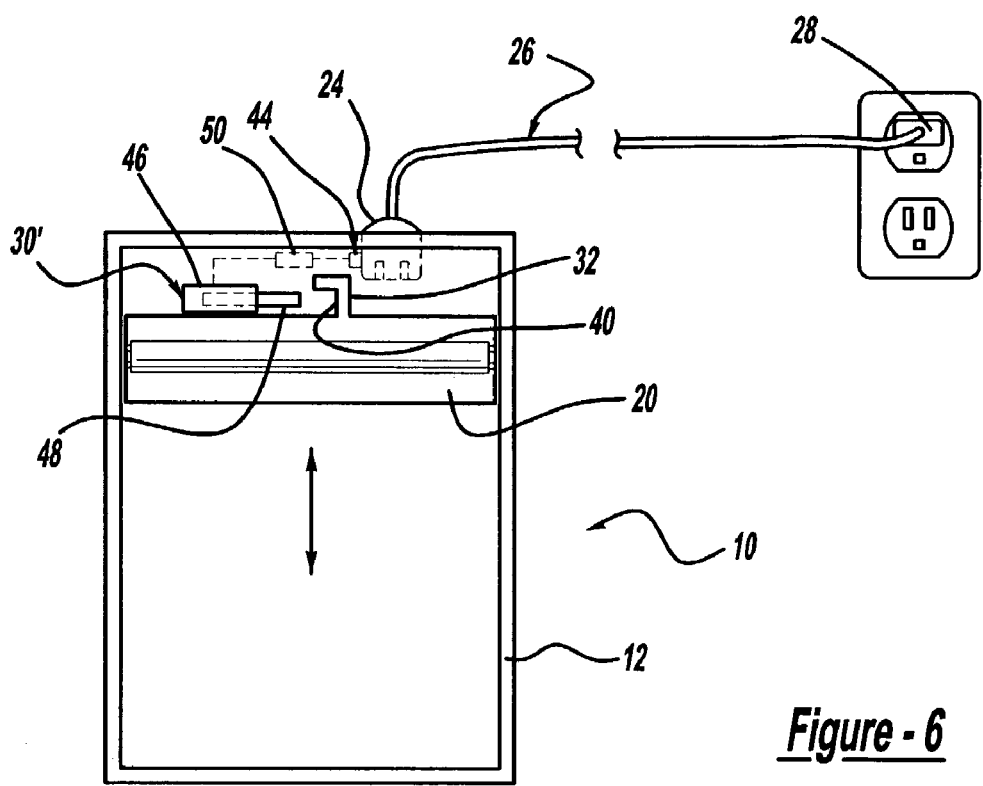
FIG. 6 shows a schematic plan view of the scanner of FIG. 5 in the unlatched position.

FIG. 5 shows a schematic plan view of a scanner in a latched position in accordance with an alternate embodiment of the present invention. FIG. 6 shows a schematic plan view of the scanner of FIG. 5 in the unlatched position. More specifically, FIGS. 5 and 6 show an alternate embodiment of the sensing and latching mechanisms. Like numerals will be used to designate like components among the various embodiments. As shown in FIGS. 5 and 6, a sensor, generally indicated at 44 is schematically shown. The sensor 44 can be of any type, including, but not limited to an optical, pressure or electrical sensor.

A carriage latch, generally indicated at 30' is shown. As shown, the carriage latch 30' may comprise a solenoid 46 having an armature 48 extending therefrom, as are known. The solenoid 46, and more particularly the armature 48 is moveable in response to an appropriate signal from the sensor 44. More specifically, the sensor 44 detects the presence of the first end 24 of the power cord 26 in the receptacle 22. If the first end 24 of the power cord 26 is not detected in the receptacle 22, the sensor generates a signal resulting in extending the armature 48 of the latch 30' into engagement with a suitable structure 32 on the carriage. As shown in FIG. 5, the armature 48 engages a pocket 40 in the structure 32. This places the carriage latch 30' in the latched position resulting in the locking of the carriage 20.

If the sensor 44 detects the presence of the first end 24 of the power cord 26 in the receptacle 22, the sensor 44 generates a signal resulting in the retracting of the armature 48 of the carriage latch 30' out of engagement with the pocket 40 of the structure 32 on the carriage 20. This places the carriage latch 30' in the unlatched position, resulting in the unlocking of the carriage 20. In this position, as shown in FIG. 6, the carriage 20 can move and the scanner 10 can be used.

As stated above, the sensor 44 can take any configuration. If an optical or pressure sensor is used, the sensor 44 can detect the presence of the first end 24 of the power cord 26, either by optically detecting its presence or by physically detecting it presence, respectively. A signal can be generated by the sensor 44 and sent to a suitable processor 50. The processor 50, in response to the signal of the sensor 44 can generate and send an appropriate signal to the carriage latch 30' to engage the carriage latch 30' or to disengage the carriage latch 30' from the structure 32 on the carriage 20.

An electrical sensor 44 may be operatively associated with the power cord receptacle 22. An electrical sensor 44 can detect the presence of the first end of the power cord 26 when the second end 28 of the power cord is plugged into an outlet and the first end 24 is in the receptacle 22, by detecting electricity being supplied to the scanner 10. In this case, the electrical sensor 44 can generate a signal in the manner set forth above.

The sensor 44 may be coupled directly to the carriage latch 30' to actuate the latch 30' without the need for a suitable processor 50. For example, an electrical sensor 44' may be coupled directly to a solenoid 46. The presence or absence of the electricity will alternately respectively engage the armature 48 with the structure 32 or disengage the armature 48 from the structure 32.

When this arrangement is used, the absence of electricity to the scanner 10 will result in locking of the optical carriage 20. This may be beneficial in that when the second end 28 of the power cord 26 is removed from an outlet, the optical carriage 20 locks. Typically, this can occur when a user moves the scanner 10 without removing the first end 24 of the power cord 26 from the receptacle 22. Thus, the optical carriage 20 remains locked until the power cord 26 is plugged in.

Each of the mechanisms for sensing the presence of the first end 24 of the power cord 26 or the presence of electricity supplied to the unit comprises a sensing means for detecting the presence of the first end 24 of the power cord 26 in the receptacle 22. These sensing means are operatively associated with the latch 30, 30' to thereby move the latch 30, 30' to the unlocked position in response to insertion of the first end 24 of the power cord 26 into the receptacle. The sensing means are also operatively associated with the latch 30, 30' to thereby move the latch 30, 30' to the locked position in response to removal of the first end 24 of the power cord 26 from the receptacle 22.

It will be appreciated that while the carriage latch 30' is shown to be a solenoid 46, the carriage latch 30' can take any configuration, such as, for example, an electric motor used to drive an appropriate engaging member. Additionally, while the carriage latch 30' is shown to act perpendicularly to the path of insertion of the first end 24 of the power cord 26 into the receptacle, it can act parallel to or collinearly with the path of travel of the first end 24 of the power cord 26. Similarly, the carriage latch 30' can act in a rotational manner.

In operation, the position of the power cord with respect to the power cord receptacle is sensed. When the first end of the power cord 24 is not present in the receptacle 22, the latch 30, 30' is in the latched position as best seen in FIGS. 2 and 5. In this position, the latch 30, 30' engages a suitable structure 32 on the optical carriage 20 to prevent movement of the carriage 20. When the first end of the power cord 24 is inserted in the receptacle 22 and in one embodiment when the second end 28 of the power cord 26 is inserted into an outlet, the latch 30, 32 moves to the unlatched position as best seen in FIGS. 4 and 6. In this position, the latch 30, 30' is moved out of the structure 32 on the optical carriage 20, and the optical carriage 20 is free to move, allowing use of the scanner 10. Upon removal of the first end 24 of the power cord 26 from the receptacle 22, the latch 30, 30' moves back to the latched position, preventing movement of the carriage 20.

With the carriage lock as described above, the carriage 20 of the scanner is automatically locked when the first end 24 of the power cord is removed from the receptacle 22. Thus, during shipment, or anytime the first end 24 is unplugged from the scanner 10, such as during moving of the scanner, the carriage 20 is locked, reducing the potential for damage to the scanner's components. Similarly, any time the first end 24 is in the receptacle 22, the scanner 10 and particularly the carriage 20 is automatically unlocked, allowing the carriage 20 to move, thereby allowing use of the scanner. This automatic unlocking helps reduce damage to the scanner's components, such as the motor used to drive the carriage, by preventing attempts to use the scanner while the carriage 20 is locked.

It will be appreciated that while the carriage lock mechanism was described in connection with a scanner that the carriage lock mechanism can be adapted for use to lock other electromechanical devices, such as CD Roms, DVD Roms and hard drives. The moving components of those devices can be secured in the manner described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A carriage locking system for a device comprising:
    a housing having a power cord receptacle;
    a carriage moveable in said housing;
    a power cord for insertion into said power cord receptacle;
    a carriage latch moveable between a latched position to prevent movement of said carriage and an unlatched position allowing for movement of said carriage;
    a sensor operative to detect the presence of said power cord in said receptacle and operatively associated with said latch such that said latch moves to said unlatched position when said power cord is inserted in said power cord receptacle and said latch moves to said latched position when said power cord is removed from said power cord receptacle.

2. The carriage locking system as set forth in claim 1 wherein said sensor comprises an electrical sensor which detects electricity, said carriage moving to said latched position in the absence of electricity to said scanner and said carriage latch moving to said unlatched position when electricity is supplied to said scanner.

3. The carriage locking system as set forth in claim 1 further comprising a processor, said processor receiving a signal from said sensor and generating a signal for said carriage latch to selectively move carriage latch between the latched and unlatched positions in response to the respective absence and presence of said power cord in said power cord receptacle.

4. The carriage locking system as set forth in claim 3 wherein said sensor is an optical sensor.

5. The carriage locking system as set forth in claim 3 wherein said sensor is an electrical sensor.

6. The carriage locking system as set forth in claim 3 wherein said sensor is a pressure sensor.

7. The carriage locking system as set forth in claim 1 wherein said sensor is a ramped surface.

8. The carriage locking system as set forth in claim 1 wherein said carriage latch comprises a solenoid.

9. The carriage locking system as set forth in claim 1 wherein said carriage latch comprises a motor and an engaging member.

10. The carriage locking system as set forth in claim 1 wherein said carriage latch comprises an engaging member.

11. An carriage locking system for a device:
    a housing having a power cord receptacle;
    a carriage means for movement in said housing;
    a power cord for insertion into said power cord receptacle;
    a carriage latch means for movement between a latched position to prevent movement of said carriage and an unlatched position allowing for movement of said carriage; and
    a sensor means for detecting the presence of said power cord in said receptacle and operatively associated with said carriage latch such that said carriage latch moves to said unlatched position when said power cord is inserted in said power cord receptacle and said carriage latch moves to said latched position when said power cord is removed from said power cord receptacle.

12. The carriage locking system as set forth in claim 11 wherein said sensor means comprises an electrical sensor which detects electricity, said carriage moving to said latched position in the absence of electricity to said scanner and said carriage latch moving to said unlatched position when electricity is supplied to said scanner.

13. The carriage locking system as set forth in claim 12 further comprising a processor, said processor receiving a signal from said sensor means and generating a signal for said carriage latch to selectively move carriage latch between the latched and unlatched positions in response to the respective absence and presence of said power cord in said power cord receptacle.

14. The carriage locking system as set forth in claim 13 wherein said sensor means further comprises an optical sensor.

15. The carriage locking system as set forth in claim 13 wherein said sensor means further comprises an electrical sensor.

16. The carriage locking system as set forth in claim 13 wherein said sensor means further comprises a pressure sensor.

17. The carriage locking system as set forth in claim 11 wherein said sensor means further comprises ramped surface.

18. The carriage locking system as set forth in claim 11 wherein said carriage latch means comprises a solenoid.

19. The carriage locking system as set forth in claim 11 wherein said carriage latch means comprises a motor and an engaging member.

20. The carriage locking system as set forth in claim 11 wherein said carriage latch means comprises an engaging member.

21. A method of locking a carriage of a device including a housing having a power cord receptacle for receiving a power cord and a carriage moveable in the housing, said method comprising the steps of selectively:

inserting the power cord into the power cord receptacle to thereby move a carriage latch to an unlatched position in response to the insertion of the power cord into the power cord receptacle wherein the carriage is moveable with respect to the housing; and removing the power cord from the power cord receptacle and to thereby move a carriage latch to a latched positioning response to the removal of the power cord from the power cord receptacle wherein the carriage is locked with respect to the housing.

* * * * *